United States Patent
Baba et al.

(10) Patent No.: US 11,174,327 B2
(45) Date of Patent: Nov. 16, 2021

(54) METHOD FOR PRODUCING MODIFIED POLYVINYL ALCOHOL RESIN

(71) Applicant: KURARAY CO., LTD., Kurashiki (JP)

(72) Inventors: Masahiro Baba, Kurashiki (JP); Toshinori Kato, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 9 days.

(21) Appl. No.: 16/627,155

(22) PCT Filed: Jun. 28, 2018

(86) PCT No.: PCT/JP2018/024576
§ 371 (c)(1),
(2) Date: Dec. 27, 2019

(87) PCT Pub. No.: WO2019/004352
PCT Pub. Date: Jan. 3, 2019

(65) Prior Publication Data
US 2020/0140578 A1 May 7, 2020

(30) Foreign Application Priority Data

Jun. 30, 2017 (JP) .............................. JP2017-128194

(51) Int. Cl.
*C08F 8/28* (2006.01)

(52) U.S. Cl.
CPC ..................................... *C08F 8/28* (2013.01)

(58) Field of Classification Search
CPC ................................ C08F 8/28; C08F 216/06
See application file for complete search history.

(56) References Cited

U.S. PATENT DOCUMENTS

| | | | | |
|---|---|---|---|---|
| 5,288,575 A | * | 2/1994 | Kashizaki | G03G 5/055 358/296 |
| 2017/0190812 A1 | * | 7/2017 | Horiguchi | B01J 4/001 |

FOREIGN PATENT DOCUMENTS

| JP | 31-8592 B | 10/1956 |
|---|---|---|
| JP | 44-27738 B | 11/1969 |
| JP | 49-26953 | 7/1974 |
| JP | 49-41349 | 11/1974 |
| JP | 63-273603 A | 11/1988 |
| JP | 7-2931 A | 1/1995 |
| JP | 10-101729 A | 4/1998 |

OTHER PUBLICATIONS

English translation of Suyama et al., "Regarding acetalization of polyvinyl alcohol by benzaldehyde," Synthetic Fiber Research, vol. 1, No. 1, 1942, pp. 259-269.*
English translation of Nakamura, "Polyvinyl acetal," Nippon Gomu Kyokaishi, vol. 14, No. 6, 1941, pp. 463-468.*
International Search Report dated Sep. 11, 2018 in PCT/JP2018/024576 filed Jun. 28, 2018, 2 pages total.
Suyama et al., "Regarding acetalization of polyvinyl alcohol by benzaldehyde," Synthetic Fiber Research, vol. 1, No. 1, 1942, pp. 259-269.
Noma et al., "Limit of acetalization of polyvinyl alcohol," Society of Polymer Chemistry, vol. 6, No. 58, 1949, pp. 439-443.
Nakamura, "Polyvinyl acetal," Nippon Gomu Kyokaishi, vol. 14, No. 6, 1941, pp. 463-468.
Yamada, "About vinyl resin," Journal of Synthetic Organic Chemistry, Japan, vol. 2, No. 8, 1944, pp. 518-526. (w/Certified Partial English Translation).

* cited by examiner

*Primary Examiner* — Jeffrey C Mullis
(74) *Attorney, Agent, or Firm* — Oblon, McClelland, Maier & Neustadt, L.L.P.

(57) ABSTRACT

There is provided a method for producing a modified polyvinyl alcohol resin, comprising step (A) of acetalizing polyvinyl alcohol particles swollen with a solvent capable of swelling the polyvinyl alcohol particles by reacting them with a carbonyl compound and/or an acetalized carbonyl compound in the presence of the solvent, wherein a content of an organic solvent in the solvent is 5% by mass or more.

12 Claims, No Drawings

METHOD FOR PRODUCING MODIFIED POLYVINYL ALCOHOL RESIN

TECHNICAL FIELD

The present invention relates to a method for producing a modified polyvinyl alcohol resin.

BACKGROUND ART

A modified polyvinyl alcohol resin produced by reaction of a polyvinyl alcohol with a carbonyl compound is tough, excellent in chemical resistance, and adhesive to a variety of materials. For example, a polyvinyl butyral resin obtained by reacting a polyvinyl alcohol with butyl aldehyde is utilized in a wide variety of applications such as a coating material, an interlayer film for a safety glass, an adhesive and a binder.

As a method for producing a modified polyvinyl alcohol resin by reacting a polyvinyl alcohol with a carbonyl compound, a typical method for producing a polyvinyl butyral which is industrially used at present, comprises reacting a polyvinyl alcohol with a carbonyl compound in an aqueous solvent in the presence of an acid catalyst leading to precipitation of a modified polyvinyl alcohol resin produced, neutralizing the obtained liquid with an alkali, removing the liquid phase, washed the precipitate with water, and drying it to obtain a polyvinyl butyral. Patent Reference No. 1 has disclosed a method for producing a polyvinyl acetal resin by reacting polyvinyl alcohol particulates with butyl aldehyde at a temperature of 60° C. or higher in an aqueous medium.

PRIOR ART REFERENCES

Patent References

Patent Reference No. 1: JP 7-2931 A

SUMMARY OF THE INVENTION

Problems to be Solved by the Invention

The typical production method which is industrially utilized at present can be applied only to a water-soluble carbonyl compound. A higher temperature and a longer time are needed for dissolving a polyvinyl alcohol in water, and the solution must be cooled to a temperature for conducting acetalization, leading to large energy loss and a lower production efficiency. An increased concentration of the aqueous solution of polyvinyl alcohol makes stirring difficult due to viscosity increase, so that a volume efficiency of the reaction vessel cannot be increased. Furthermore, for removing a water-soluble modified polyvinyl alcohol resin from the reaction liquid, the following step is needed: drying the resin after removing a neutralized salt, or adding an organic solvent which is compatible with water and acts as a precipitant for a modified polyvinyl alcohol resin produced. Thus, it has a problem of a complicated production process.

The production method described in Patent Reference No. 1 has a problem that since a reaction solvent is water alone and polyvinyl alcohol particulates are partly dissolved, an acetalizing degree and tacticity become different between a polyvinyl acetal resin obtained from the dissolved part and a polyvinyl acetal resin obtained from the undissolved part, giving a nonuniform product. The method described in Patent Reference No. 1 also has a problem that a swelling degree of the polyvinyl alcohol particulates is so high that a volume efficiency of a reaction vessel is reduced and thus productivity is reduced.

To solve the above problems, an objective of the present invention is to provide a method for producing a modified polyvinyl alcohol resin, which can be applied to a wide variety of carbonyl compounds with a higher industrial productivity. A limited objective of the present invention is to provide a method for producing a modified polyvinyl alcohol resin, whereby polyvinyl alcohol particles are homogeneously acetalized to the inside.

Means for Solving the Problems

The objectives of the present invention are achieved by providing the following [1] to [16].

[1] A method for producing a modified polyvinyl alcohol resin, comprising step (A) of acetalizing polyvinyl alcohol particles swollen with a solvent capable of swelling the polyvinyl alcohol particles by reacting them with a carbonyl compound and/or an acetalized carbonyl compound in the presence of the solvent, wherein a content of an organic solvent in the solvent is 5% by mass or more.

[2] The method for producing a modified polyvinyl alcohol resin according to [1], wherein the modified polyvinyl alcohol resin as a product in a reaction liquid at the end of step (A) is particulate.

[3] The method for producing a modified polyvinyl alcohol resin according to [1] or [2], wherein the solvent has Hansen solubility parameters, δD: 15.0 or more and 20.0 or less, δP: 1.0 or more and 20.0 or less, and δH: 3.0 or more and 41.0 or less.

[4] The method for producing a modified polyvinyl alcohol resin according to any of [1] to [3], wherein the solvent contains 5 to 95% by mass of water.

[5] The method for producing a modified polyvinyl alcohol resin according to any of [1] to [4], wherein the organic solvent is at least one selected from the group consisting of dialkyl ketones, nitriles, alcohols and ethers.

[6] The method for producing a modified polyvinyl alcohol resin according to any of [1] to [5], wherein the organic solvent is at least one selected from the group consisting of acetone, 2-butanone, acetonitrile, methanol, ethanol, 1-propanol, 2-propanol, tert-butanol, 1,4-dioxane and tetrahydrofuran.

[7] The method for producing a modified polyvinyl alcohol resin according to any of [1] to [6], wherein a content of an alkyl acetate in the solvent is 90 mol % or less based on the number of structural units constituting the polyvinyl alcohol contained in the polyvinyl alcohol particles.

[8] The method for producing a modified polyvinyl alcohol resin according to any of [1] to [7], wherein a swelling degree, which is defined as a volume increasing rate when 15 g of the solvent is added to 0.5 g of the polyvinyl alcohol particles followed by stirring at 60° C. and 200 rpm for one hour, is 105 to 1000 vol %.

[9] The method for producing a modified polyvinyl alcohol resin according to any of [1] to [8], wherein the amount of the polyvinyl alcohol particles is 1% by mass or more and 95% by mass or less based on the total mass of the reaction liquid after adding the polyvinyl alcohol particles.

[10] The method for producing a modified polyvinyl alcohol resin according to any of [1] to [9], wherein step (A) is conducted in the presence of an acid catalyst.

[11] The method for producing a modified polyvinyl alcohol resin according to any of [1] to [10], wherein the carbonyl compound is an aldehyde.

[12] The method for producing a modified polyvinyl alcohol resin according to any of [1] to [11], wherein a modified polyvinyl alcohol resin with an acetalization degree of 1 mol % or more and 90 mol % or less is produced.

[13] The method for producing a modified polyvinyl alcohol resin according to any of [1] to [12], wherein a saponification degree of the polyvinyl alcohol resin contained in the polyvinyl alcohol particles is 30 mol % or more.

[14] The method for producing a modified polyvinyl alcohol resin according to any of [1] to [13], wherein an average polymerization degree of the polyvinyl alcohol resin contained in the polyvinyl alcohol particles is 500 or more and 4500 or less.

[15] The method for producing a modified polyvinyl alcohol resin according to any of [1] to [14], wherein the polyvinyl alcohol particles have an average particle size of 1000 μm or less.

[16] The method for producing a modified polyvinyl alcohol resin according to any of [1] to [15], wherein when 10 g of the modified polyvinyl alcohol resin obtained is added to 90 g of the solvent followed by stirring at 200 rpm and the same temperature as the reaction temperature of step (A) for 2 hours, the amount of an undissolved residue is 8 g or more.

Effects of the Invention

A method for producing a modified polyvinyl alcohol resin of the present invention can be applicable to a wide variety of carbonyl compound with a higher industrial productivity. In a particular aspect of the present invention, polyvinyl alcohol particles can be homogeneously acetalized to the inside. A modified polyvinyl alcohol resin produced by the production method of the present invention can be used in, depending on the types of a carbonyl compound and/or an acetalized carbonyl compound used, a variety of applications such as a glass interlayer film, a laminated ceramic capacitor, an agricultural water-retaining material, a water-soluble film, a food packaging material, a petrol tank, a thermal paper overcoat material and electronic parts.

MODES FOR CARRYING OUT THE INVENTION

A method for producing a modified polyvinyl alcohol resin of the present invention comprises step (A) of acetalizing polyvinyl alcohol particles swollen with a solvent capable of swelling the polyvinyl alcohol particles by reacting them with a carbonyl compound and/or an acetalized carbonyl compound in the presence of the solvent.

The polyvinyl alcohol particles used in step (A) contain a polyvinyl alcohol. The polyvinyl alcohol can consist of vinyl alcohol units; or vinyl alcohol units and vinyl ester units; or these units and further structural units derived from an ethylenic unsaturated monomer copolymerizable with a vinyl ester monomer. A content of vinyl alcohol units in the polyvinyl alcohol is preferably mol % or more, more preferably 60 mol % or more, further preferably, in the light of facilitating reaction with a carbonyl compound, 80 mol % or more. The vinyl ester unit is preferably a vinyl acetate unit in the light of manufacturing easiness.

Examples of the above ethylenic unsaturated monomer include olefins such as ethylene, 1-butene and isobutylene; acrylic acid and derivatives thereof; methacrylic acid and derivatives thereof; acrylamide and derivatives thereof; methacrylamide and derivatives thereof; maleic acid and derivatives thereof; maleic anhydride and derivatives thereof. These can be used alone or in combination of two or more. A content of the other structural units derived from an ethylenic unsaturated monomer is preferably 30 mol % or less, more preferably 15 mol % or less, further preferably 5 mol % or less. With a content of the other structural units being the above upper limit or less, the polyvinyl alcohol can have sufficient reaction points with the carbonyl compound for smooth progression of the reaction of the polyvinyl alcohol with the carbonyl compound. "A structural unit" as used in the present invention refers to a repeating unit constituting a polymer, and thus the vinyl alcohol unit and the vinyl ester unit described above is a structural unit.

An average polymerization degree of the polyvinyl alcohol is, but not limited to, preferably 4500 or less, more preferably 2500 or less, in the light of handleability. It is, but not limited to, preferably 500 or more, more preferably 1000 or more, further preferably 1500 or more in the light of mechanical properties of a modified polyvinyl alcohol resin produced. An average polymerization degree of a polyvinyl alcohol can be determined by, for example, a method in accordance with JIS K 6726.

The above polyvinyl alcohol can be commercially available or produced by any of various known production methods. Examples of such a production method include (i) a method comprising polymerizing a vinyl ester such as vinyl acetate, if necessary, in the presence of another monomer, using a polymerization initiator followed by saponification; (ii) a method comprising cation polymerization of a vinyl ether followed by hydrolysis; and (iii) direct polymerization of acetaldehyde. Among others, the method of (i) is preferable, and a method comprising polymerizing vinyl acetate and saponifying a polyvinyl acetate obtained is more preferable. A saponification degree of the polyvinyl alcohol is preferably 30 mol % or more, more preferably 60 mol % or more, further preferably, in the light of facilitating reaction with a carbonyl compound, 80 mol % or more.

An average particle size of the polyvinyl alcohol particles is, but not limited to, preferably 2000 μm or less, more preferably 1000 μm or less, in the light of homogeneously acetalizing the polyvinyl alcohol particles to the inside. An average particle size of the polyvinyl alcohol particles is preferably 1 μm or more, more preferably 10 μm or more. With an average particle size of the polyvinyl alcohol particles being the lower limit or more, filter clogging can be easily prevented during deliquoring using a filter after step (A), and thus, a modified polyvinyl alcohol resin tends to be efficiently produced. An average particle size can be determined by measuring particle size distribution by laser diffraction for a dispersion of polyvinyl alcohol particles in a solvent. More specifically, it can be determined by a method described in Examples. Furthermore, it is also preferable that the polyvinyl alcohol particles are porous in the light of homogeneous acetalization to the inside of the particles. When the above polyvinyl alcohol particles are porous, a median pore size is preferably 0.001 μm to 50 μm, more preferably 0.01 μm to 20 μm. A median pore size can be measured by mercury intrusion technique using, for example, a porosimeter (for example, AutoPore IV9520 from Shimadzu Corporation).

A content of a polyvinyl alcohol in the polyvinyl alcohol particles is preferably 80% by mass or more, more preferably 90% by mass or more based on the mass of the polyvinyl alcohol particles, and can be 100% by mass. Although the above polyvinyl alcohol particles can contain components other than a polyvinyl alcohol, a content of such components other than a polyvinyl alcohol is preferably 20% by mass or less, more preferably 10% by mass or less based on the mass of the polyvinyl alcohol particles. There are no particular restrictions to the components other than a polyvinyl alcohol as long as they do not impair the effects of the present invention, and they include water, organic solvents, inorganic salts, plasticizers, antioxidants, defoamers and ultraviolet absorbers.

There are no particular restrictions to the amount of the polyvinyl alcohol particles in step (A), which is adjusted, taking a reaction volume efficiency and a swelling degree of the polyvinyl alcohol particles into account. The amount of the polyvinyl alcohol particles is preferably 1% by mass or more, more preferably 5% by mass or more, further preferably 10% by mass or more, and preferably 95% by mass or less, more preferably 90% by mass or less, further preferably 80% by mass or less, based on the total mass of the reaction liquid after adding the polyvinyl alcohol particles. With the amount of the polyvinyl alcohol being the above lower limit or more, productivity tends to be improved. In a production method of the present invention in which the polyvinyl alcohol particles are not dissolved but swollen with a solvent, a solution viscosity is lower than that in the case where the polyvinyl alcohol is dissolved, so that the amount of the polyvinyl alcohol can be higher. With the amount of the polyvinyl alcohol being the above upper limit or less, troubles during stirring (for example, stirring using an stirring blade) or kneading tend to be reduced.

There are no particular restrictions to a solvent used in step (A) as long as it is capable of swelling the polyvinyl alcohol particles and a content of an organic solvent is 5% by mass or more. Whether or not the polyvinyl alcohol particles are swollen in step (A) depends not only on a composition of the solvent, but also on a solvent temperature, a composition of the polyvinyl alcohol particles used and so on. It is difficult to determine a composition of the solvent used in step (A) unambiguously, but it can be selected using Hansen solubility parameters described below.

Hansen solubility parameters of the solvent used in step (A) are as follows: preferably δD is 15.0 or more and 20.0 or less, δP is 1.0 or more and 20.0 or less, and δH is 3.0 or more and 41.0 or less; more preferably δD is 15.0 or more and 18.0 or less, δP is 5.0 or more and 19.0 or less, and δH is 5.0 or more and 35.0 or less; and further preferably δD is 15.0 or more and 16.0 or less, δP is 10.0 or more and 18.0 or less, and δH is 8.0 or more and 30.0 or less. With Hansen solubility parameters of the solvent being within the above ranges, there is a tendency that the polyvinyl alcohol particles are moderately swollen and acetalization well proceeds while a volume efficiency of the reaction vessel is improved. Hansen solubility parameters are three-dimensionally represented a solubility parameter introduced by Hildebrand which are divided into three components: a dispersion term δD, a polar term δP and a hydrogen bond term δH. A dispersion term δD represents an effect of nonpolar interaction; a polar term δP represents an effect of a dipole-dipole force; and a hydrogen bond term δH represents an effect of hydrogen bond strength. Herein, Hansen solubility parameters are calculated using values extracted from Hansen Solubility Parameters: A User's Handbook. A Hansen solubility parameter of a mixed solvent prepared by blending a plurality of solvents is determined by measuring a Hansen solubility parameter for each pure solvent contained in the mixed solvent, multiplying the value by a volume fraction of the pure solvent in the mixed solvent and summing the products for all the solvents, which is represented by one of the following equations. Here, δDmix, δPmix and δHmix are a dispersion term, a polar term and a hydrogen bond term, respectively, of Hansen solubility parameters of the mixed solvent; δDn, δPn and δHn are a dispersion term, a polar term, and a hydrogen bond term, respectively, of Hansen solubility parameters of a pure solvent as the $n^{th}$ component (n is a natural number) in the mixed solvent; and xn is a volume fraction of such a pure solvent in the mixed solvent. Here, a volume fraction of a solvent is calculated by dividing a volume of a pure solvent before mixing by the sum of all the pure solvents before mixing.

$$\delta Dmix = \Sigma(\delta Dn \times xn)$$

$$\delta Pmix = \Sigma(\delta Pn \times xn)$$

$$\delta Hmix = \Sigma(\delta Hn \times xn)$$

A content of an organic solvent in the solvent used in step (A) is 5% by mass or more. If a content of the organic solvent is less than 5% by mass, the polyvinyl alcohol particles are partly dissolved in the solvent. Here, reactivity with a carbonyl compound is different between dissolved polyvinyl alcohol and undissolved polyvinyl alcohol, so that a modified polyvinyl alcohol resin obtained becomes a mixture of modified polyvinyl alcohol resins different in an acetalization degree and tacticity. Furthermore, if a content of the above organic solvent is less than 5% by mass, the polyvinyl alcohol particles are excessively swollen in the solvent, so that a volume efficiency of a reaction vessel is reduced and a production efficiency is reduced. It is, therefore, important that a content of the organic solvent is 5% by mass or more. A content of the organic solvent can be adjusted depending on a carbonyl compound and/or the type of the carbonyl compound, and it is preferably 10% by mass or more, more preferably 20% by mass or more, further preferably 30% by mass or more, more further preferably 50% by mass or more, particularly preferably 70% by mass or more, most preferably 80% by mass or more, and it can be 100% by mass. With a content of the organic solvent being the above lower limit or more, a modified polyvinyl alcohol resin with a narrow distribution of an acetalization degree or tacticity is easily obtainable. A content of the organic solvent is preferably 95% by mass or less, more preferably 92% by mass or less, further preferably 90% by mass or less, particularly preferably 85% by mass or less. With a content of the organic solvent being the above upper limit or less, there is a tendency that the polyvinyl alcohol particles are moderately swollen and a carbonyl compound is easily soluble, so that the polyvinyl alcohol particles can be homogeneously acetalized to the inside.

Examples of the above organic solvent include, but not limited to, dialkyl ketones such as acetone and 2-butanone; nitriles such as acetonitrile; alcohols such as methanol, ethanol, 1-propanol, 2-propanol, 1-butanol, 2-butanol, amyl alcohol, isoamyl alcohol, hexanol, cyclohexanol, octanol and tert-butanol; ethers such as 1,4-dioxane, tetrahydrofuran, 1,2-diethoxyethane and diglyme; diol compounds such as ethylene glycol and triethylene glycol; carboxylic amides such as acetamide, N,N-dimethylformamide, N,N-dimethylacetamide and N-methylpyrrolidone; dimethylsulfoxide; and phenol. Among these, the above organic solvent is preferably at least one selected from the group consisting of dialkyl ketones, nitriles, alcohols and ethers, more preferably at least one selected from the group consisting of acetone, 2-butanone, acetonitrile, methanol, ethanol, 1-propanol, 2-propanol, tert-butanol, 1,4-dioxane and tetrahydrofuran, further preferably at least one selected from the group consisting of acetone, 2-butanone, acetonitrile, methanol, 2-propanol, 1,4-dioxane and tetrahydrofuran, in the light of ease of removing a solvent from a modified polyvinyl alcohol resin obtained after step (A), solubility of a carbonyl compound and an acid catalyst in a solvent, and industrial availability of a solvent. The organic solvents can be used alone or in combination of two or more. As described later, a solvent used in step (A) can contain water, but when a solvent used in step (A) does not contain water, the organic solvent is preferably at least one selected from the group consisting of dialkyl ketones, nitriles, alcohols and ethers, more preferably a dialkyl ketone and/or a nitrile, further preferably acetone and/or acetonitrile. Since interaction between a modified polyvinyl alcohol resin and a solvent varies as the acetalization reaction proceeds, a solvent can be added in the course of the reaction for regulating a swelling degree.

In an aspect of the present invention, a solvent used in step (A) preferably contains 5 to 95% by mass of water. A content of water in the solvent is more preferably 8% by mass or more, further preferably 10% by mass or more, particularly preferably 15% by mass or more, and more preferably 80% by mass or less, further preferably 70% by mass or less. With a water content being the above lower limit or more, there is a tendency that a swelling degree of the polyvinyl alcohol particles is moderately increased and acetalization easily proceeds, so that the particles can be homogeneously acetalized to the inside. With the water content being the above upper limit or less, there is a tendency that a swelling degree of the polyvinyl alcohol particles is moderately reduced and a volume efficiency of the reaction vessel is improved, and the polyvinyl alcohol particles is poorly soluble in a solvent. Therefore, a modified polyvinyl alcohol resin with a narrow distribution of an acetalization degree or tacticity is easily obtainable.

A content of an alkyl acetate in a solvent used in step (A) is preferably 90 mol % or less, more preferably 80 mol % or less, further preferably 50 mol % or less, particularly preferably 10 mol % or less based on the number of structural units constituting the polyvinyl alcohol contained in the polyvinyl alcohol particles, and it can be 0 mol %. With a content of the alkyl acetate being the above upper limit or less, there is a tendency that a reverse reaction, where the alkyl acetate reacts with an hydroxy group in the polyvinyl alcohol to form an ester bond again, hardly proceeds, resulting in a higher reaction rate of acetalization. The term "the number of structural units constituting the polyvinyl alcohol contained in the polyvinyl alcohol particles" as used herein, means the total number of structural units constituting the polyvinyl alcohol contained in the total polyvinyl alcohol particles used, and can be calculated according to the following formula: (a mass of the polyvinyl alcohol contained in the total polyvinyl alcohol particles used)/(a molar mass of structural units constituting the polyvinyl alcohol).

A swelling degree, which is defined as a volume increasing rate when 15 g of the solvent used in step (A) is added to 0.5 g of the polyvinyl alcohol particles used in step (A) followed by stirring at 60° C. and 200 rpm for one hour, is preferably 105 to 1000 vol %. The swelling degree is more preferably 108 vol % or more, further preferably 110 vol % or more, and more preferably 700 vol % or less, further preferably 500 vol % or less. With the swelling degree being the above lower limit or more, there is a tendency that a carbonyl compound and/or an acetalized carbonyl compound easily diffuse into the inside of the polyvinyl alcohol particles, so that the particles are homogeneously acetalized to the inside. With the swelling degree being the above upper limit or less, there is a tendency that a concentration of the polyvinyl alcohol in the reaction vessel increases, resulting in improved productivity. Here, the swelling degree is specifically determined by the method described in Examples.

There are no particular restrictions to a carbonyl compound and/or an acetalized carbonyl compound used in step (A) as long as they can react with a polyvinyl alcohol to form an acetal structure; for example, aldehydes, ketones and acetals thereof can be used. Among these, aldehydes are preferable in the light of reactivity with a polyvinyl alcohol. Examples of such an aldehyde include saturated aliphatic aldehydes such as formaldehyde, acetaldehyde, trifluoroacetaldehyde, propionaldehyde, 1-butanal, isobutylaldehyde, tert-butylaldehyde, pentanal, 3-methyl-butanal, 1-hexanal, 1-heptanal, 1-octanal, 2-ethylhexanal, 1-nonanal, 1-decanal, 3,7-dimethyl-1-octanal, 1-undecanal and 1-dodecanal; unsaturated aliphatic aldehydes such as acrolein, crotonaldehyde, 3-methyl-2-butenal, 3-methyl-3-butenal, citral, citronellal, 7-octenal, famesal, perillaldehyde and vanillin; alicyclic aldehydes such as cyclohexanecarbaldehyde, cyclohexenecarbaldehyde, 2-cyclohexene-1-carbaldehyde, 3-cyclohexene-1-carbaldehyde, 2,6-dimethyl-2-cyclohexene-1-carbaldehyde, cyclooctanecarbaldehyde and norbomanecarbaldehyde; aromatic aldehydes such as benzaldehyde, pentafluorobenzaldehyde, 2-hydroxybenzaldehyde, 3-hydroxybenzaldehyde, 4-hydroxybenzaldehyde, 5-fluoro-2-hydroxybenzaldehyde, 3,5-bistrifluoromethylbenzaldehyde, 2,4-bistrifluoromethylbenzaldehyde, ortho-benzaldehyde sulfonic acid, meta-benzaldehydesulfonic acid, para-benzaldehydesulfonic acid, furfural, 2-phenylpropanal, 3-phenylpropanal, cinnamaldehyde, 3-(4-tert-butylphenyl) isobutylaldehyde, imidazole-1-carbaldehyde, imidazole-2-carbaldehyde, imidazole-4-carbaldehyde, imidazole-5-carbaldehyde, pyridine-2-carbaldehyde, pyridine-3-carbaldehyde, pyridine-4-carbaldehyde, pyrrole-1-carbaldehyde, pyrrole-2-carbaldehyde and pyrrole-3-carbaldehyde; dialdehydes such as glyoxale, glutaraldehyde, 3-methylglutaraldehyde, 1,9-nonanedial and 2-methyloctane-1,8-dial; and carboxyl group-containing aldehydes such as glyoxylic acid and formylacetic acid. Among the above aldehydes, aldehydes having a carboxyl group or a sulfo group can be a salt. When the aldehyde forms a salt, examples of a counter cation in such a salt include alkali metal ions such as lithium ion, sodium ion, potassium ion, rubidium ion and cesium ion; alkaline earth metal ions such as magnesium ion, calcium ion, strontium ion and barium ion; other metal ions such as aluminum ion and zinc ion; onium cations such as ammonium ion, imidazolium ion, pyridinium ion and phosphonium ion. Among these, when a modified polyvinyl alcohol resin produced by a production method of the present invention is used as an agricultural water-retaining material, potassium ion, calcium ion and ammonium ion are preferable, and potassium ion is preferable. These counter cations can be used alone or in combination of two or more.

Examples of an acetalized aldehyde include acetals, hemiacetals and thioacetals, and in the light of reactivity, preferred are acetals and hemiacetals, and more preferred are acetalized derivatives with a lower alcohol such as methanol, ethanol, 1-propanol, 2-propanol, 1-butanol, 2-butanol, ethylene glycol and 1,3-propanediol. Examples of an acetalized aldehyde forming a derivative with a lower alcohol include aminoacetaldehyde dimethylacetal, 4-aminobutylaldehyde dimethylacetal, 3-(1,3-dioxalan-2-yl)-2-methyl-1-propene, 1,3-dioxane and 1,3-dioxolane. Furthermore, an aldehyde derivative in which a hydroxy group and an aldehyde group form an intramolecular acetal or hemiacetal such as 4-methyl-2-hydroxytetrahydropyrane and 4-methyl-2-hydroxytetrahydrofuran can be used.

Examples of a ketone include acetone, 2-butanone, 2-pentanone, acetophenone, cyclohexanone, 2-cyclohexenone, 3-cyclohexenone and acetalized derivatives thereof. Examples of an acetalized ketone include acetals, hemiacetals and thioacetals.

Among the above carbonyl compounds and/or acetalized carbonyl compounds, preferred are 1-butanal, isobutylaldehyde, 1-octanal, 1-nonanal, glyoxylic acid, formylacetic acid, ortho-benzaldehydesulfonic acid, meta-benzaldehydesulfonic acid, para-benzaldehydesulfonic acid, 4-methyl-2-hydroxytetrahydropyrane, 4-methyl-2-hydroxytetrahydrofuran, 3-methyl-2-butenal, 3-methyl-3-butenal, 7-octenal, 3-(1,3-dioxalan-2-yl)-2-methyl-1-propene, aminoacetaldehyde dimethylacetal, 4-aminobutylaldehyde dimethylacetal, furfural, cyclohexanecarbaldehyde and norbornanaldehyde. The above carbonyl compound and the acetalized carbonyl compound can be used alone or in combination of two or more.

Except the case that a carbonyl compound and/or an acetalized carbonyl compound having a carboxyl group such as glyoxylic acid and formylacetic acid is used, an acid number of the above carbonyl compound and the acetalized carbonyl compound is preferably 20 KOH mg/g or less, more preferably 5 KOH mg/g or less, further preferably 1 KOH mg/g or less. With the acid number of the carbonyl compound and the acetalized carbonyl compound being the above upper limit or less, side reactions such as esterification in step (A), contamination of a modified polyvinyl alcohol resin obtained with impurities such as a caboxylic acid, and impurities such as a carboxylic acid in collecting an unreacted aldehyde after step (A) can be prevented, so that a modified polyvinyl alcohol resin with good quality can be easily obtained and the unreacted aldehyde can be easily reutilized. A carbonyl compound and an acetalized carbonyl compound, which are industrially available, are often contaminated by a carboxylic acid as a byproduct in a production process or a carboxylic acid generated by oxidation in the air during handling, and by removing such a carboxylic acid, an acid number of the carbonyl compound and the acetalized carbonyl compound can be within the above range. Here, an acid number as described above, means a mass (in mg) of potassium hydroxide (KOH) required for neutralizing an acid component in 1 g of the aldehyde, which is determined in accordance with JIS K0070.

The amount of the carbonyl compound and/or the acetalized carbonyl compound is appropriately adjusted, depending on a target acetalization degree and so on. Assuming that the amount of substance of the carbonyl compound and/or the carbonyl compound consumed if the total hydroxy groups in the polyvinyl alcohol are acetalized is a theoretical amount (that is, a half mole number of hydroxy groups in a polyvinyl alcohol), the amount of the carbonyl compound and/or the acetalized carbonyl compound is preferably 0.001- to 10-fold of the theoretical amount. The amount of the carbonyl compound and/or the acetalized carbonyl compound is more preferably 0.01-fold or more of the theoretical amount, further preferably 0.04-fold or more, and more preferably 5-fold or less of the theoretical amount, further preferably 2-fold or less.

An acetalization degree of a modified polyvinyl alcohol resin obtained by a production method of the present invention can be appropriately adjusted as usage of the modified polyvinyl alcohol resin obtained, and it is preferably 1 mol % or more, more preferably 1.5 mol % or more, further preferably 2 mol % or more, and preferably 90 mol % or less, more preferably 80 mol % or less, further preferably 60 mol % or less. With the acetalization degree being the above lower limit or more, modification of a polyvinyl alcohol is more effective, and with it being the above upper limit or less, a time for production can be reduced. Here, an acetalization degree (mol %) is determined by the following equation, and more specifically, determined by the method described in Examples.

Acetalization degree(mol %)=[(molar number of hydroxy groups reacting with a carbonyl compound and/or an acetalized carbonyl compound)/(the total molar number of hydroxy groups and acetyl groups in a starting polyvinyl alcohol)]×100

In the light of smooth progress of acetalization reaction, step (A) is preferably conducted in the presence of an acid catalyst. Examples of the acid catalyst include, but not limited to, mineral acids such as hydrochloric acid, nitric acid, sulfuric acid and phosphoric acid; organic acids such as acetic acid, citric acid, malic acid, succinic acid and benzoic acid; and carbonic acid, and in the light of smooth progress of acetalization, hydrochloric acid, nitric acid and sulfuric acid are preferable. Furthermore, preferred is an acid catalyst whereby pH of a reaction liquid is 2 or less. These acids can be used alone or in combination of two or more. When a carbonyl compound and/or an acetalized carbonyl compound used in step (A) have an acidic functional group such as a carboxyl group and a sulfo group, autocatalytic action allows acetalization to proceed and, therefore, there is no need to add an additional acid catalyst, but the above acid catalyst can be combined for accelerating a reaction speed.

A reaction temperature in step (A) is, but not limited to, 0 to 200° C. With a reaction temperature being 0° C. or higher, acetalization tends to smoothly progress. The reaction temperature is preferably 10° C. or higher, more preferably 20° C. or higher. With the reaction temperature being 200° C. or lower, volatilization or decomposition of a carbonyl compound, and cleavage reaction of a main chain of a starting polyvinyl alcohol or a modified polyvinyl alcohol resin obtained can be easily inhibited, and it is also advantageous in terms of a reaction apparatus cost and/or energy requirement. The reaction temperature is preferably 150° C. or lower, more preferably 130° C. or lower, further preferably 100° C. or lower.

Step (A) can be conducted with either batch-type or continuous reaction apparatus. For homogeneous progress of the reaction, the reaction apparatus is preferably equipped with means for stirring or kneading. The reaction apparatus is selected mainly based on the amount of the polyvinyl alcohol particles. When the amount of the polyvinyl alcohol particles is 20% by mass or less based on the total mass of a reaction liquid after adding the polyvinyl alcohol particles, it is preferable that the reaction is conducted with stirring by means of, for example, a stirring blade in the reaction vessel. The reaction can be conducted in a batch-type or a continuous-type, but for improving a reaction rate, a batch-type is often preferable. If the amount of the polyvinyl alcohol particles is 20% by mass or more based on the total mass of a reaction liquid after adding the polyvinyl alcohol particles, there is a tendency that viscosity becomes too high to stir the mixture by means of a stirring blade. Therefore, a kneading apparatus such as a kneader and an extruder can be used as a reaction apparatus.

A modified polyvinyl alcohol resin obtained by a production method of the present invention is preferably particulate, an aggregate or a paste in a reaction liquid at the end of step (A), and is preferably particulate. In other words, it is preferable that particles, an aggregate or a paste (preferably, particles) are visually observed in the reaction liquid at the end of step (A). When the above aspects are met, a yield of a modified polyvinyl alcohol resin obtained tends to be increased, and a process of taking out the modified polyvinyl alcohol resin from the reaction liquid becomes more convenient. Herein, "at the end of step (A)" means just before quenching the acetalization reaction by, for example, cooling the reaction liquid or adding a base such as sodium hydroxide or removing a modified polyvinyl alcohol resin as a product from the reaction liquid by filtration, deliquoring or the like.

A production method of the present invention can contain processes other than step (A). Such processes include a process of quenching the acetalization reaction by, for example, cooling the reaction liquid or adding a base such as sodium hydroxide; a process of taking out a modified polyvinyl alcohol resin from the reaction liquid; and a process of washing, if necessary, a modified polyvinyl alcohol resin taken out from the reaction liquid followed by drying. There are no particular restrictions to a method for removing a modified polyvinyl alcohol resin obtained from the reaction liquid; for example, removing a solvent and the like from the reaction liquid by heating the reaction liquid or reducing a pressure; and deliquoring by static filtration, suction filtration, pressure filtration, centrifugal dehydration or the like. Here, an unreacted aldehyde or solvent removed from the reaction liquid can be collected and reused.

There are no particular restrictions to a washing liquid for washing the modified polyvinyl alcohol resin removed from the reaction liquid; for example, organic solvents such as acetonitrile, acetone, 2-butanone, 1,4-dioxane, tetrahydrofuran, methanol, ethanol, 1-propanol, 2-propanol and tert-butanol, and water. These can be used alone or in combination of two or more. In the light of avoiding contamination with impurities and easy collection, the liquid is preferably the same as a solvent used in step (A), but its composition is not be necessarily the same.

When 10 g of a modified polyvinyl alcohol resin obtained by a production method of the present invention is added to 90 g of the above solvent and the mixture is stirred at the same temperature as the reaction temperature in step (A) and 200 rpm for 2 hours, the amount of undissolved residue is preferably 8 g or more, more preferably 8.5 g or more, further preferably 9 g or more, particularly preferably 9.5 g or more, very preferably 9.8 g or more, and can be 10 g. With the amount of undissolved residue being the above lower limit or more, after step (A), a modified polyvinyl alcohol resin produced is poorly soluble in the reaction liquid, so that an yield of the modified polyvinyl alcohol resin obtained tends to be increased, or a process of removing the modified polyvinyl alcohol resin from the reaction liquid becomes more convenient. Herein, "when 10 g of a modified polyvinyl alcohol resin produced is added to 90 g of the above solvent and the mixture is stirred at the same temperature as the reaction temperature in step (A) and 200 rpm for 2 hours, the amount of undissolved residue is preferably 8 g or more" means that while 90 g of the solvent used in producing the modified polyvinyl alcohol resin is stirred at 200 rpm, 10 g of the modified polyvinyl alcohol resin in which each particle or mass has a diameter at the longest point of 3 mm or less is added in such a way that it does not agglomerate, the mixture is stirred at the same temperature as the reaction temperature of step (A) and 200 rpm for 2 hours, the resulting solution containing undissolved residue is filtrated under reduced pressure at a differential pressure of 0.010±0.002 MPa using a filter paper classified as No. 5A defined in accordance with JIS P3801, and the residual material on the filter paper is dried at 120° C. and a pressure of 0.005 MPa or less for 6 hours to give 8 g or more of a residue. When a reaction temperature is changed in the course of step (A), the highest temperature of the reaction liquid in the course of step (A) is defined as the above "reaction temperature in step (A)". The term, "the solvent used in producing the modified polyvinyl alcohol resin" as used herein, means a solvent having the same composition as that of the solvent used in step (A), but when a solvent composition is changed in the course of step (A), it means a solvent having the same composition as that of the solvent at the end of step (A). Here, an unreacted aldehyde is not considered as a solvent.

A content of halogens in a modified polyvinyl alcohol resin obtained by a production method of the present invention is preferably 100 ppm or less, more preferably 10 ppm or less, and can be 0 ppm. With a content of the halogens being the above upper limit or less, degradation or decomposition of modified polyvinyl alcohol resin by halogens can be prevented and thus, a modified polyvinyl alcohol resin with excellent thermal stability can be easily obtained. An alkali metal content of a modified polyvinyl alcohol resin produced by a production method of the present invention is preferably 1000 ppm or less, more preferably 500 ppm or less, and can be 0 ppm. With the alkali metal content being the above upper limit or less, deterioration in electrical insulation, transparency and thermal stability of the modified polyvinyl alcohol resin by an alkali metal can be easily inhibited. Particularly, in electronic component applications, a content of the halogens and a content of the alkali metal are preferably the above upper limit or less. A content of the halogens and a content of the alkali metal can be regulated to the above upper limit or less, by, for example, washing the resin with a dialkyl ketone, a nitrile, an alcohol or water; dissolving the resin followed by contacting it with an ion-exchange resin; dialysis using a dialysis membrane; or electrodialysis using an ion-exchange membrane.

A modified polyvinyl alcohol resin produced by the production method of the present invention can be used, depending on the types of a carbonyl compound and/or an acetalized carbonyl compound used, a variety of applications such as a glass interlayer film, a laminated ceramic capacitor, a paint, an adhesive, an agricultural water-retaining material, a water-soluble film, a food packaging material, a petrol tank, a thermal paper overcoat material, electronic parts, a binder, an application requiring rubber adhesiveness, and an application requiring transparency.

EXAMPLES

There will be further specifically described the present invention with reference to Examples, but the invention is not limited to such examples.

Starting materials used are as follows. Of polyvinyl alcohol particles (A) to (E), only polyvinyl alcohol particles (E) are porous.

<Polyvinyl Alcohol Particles (A) to (E)>

Polyvinyl alcohol particles (A): polyvinyl alcohol (saponification degree: 98 mol %, average polymerization degree: 1700) content: 94% by mass, average particle size: 100 μm.

Polyvinyl alcohol particles (B): polyvinyl alcohol (saponification degree: 98 mol %, average polymerization degree: 1700) content: 94% by mass, average particle size: 770 μm.

Polyvinyl alcohol particles (C): polyvinyl alcohol (saponification degree: 98 mol %, average polymerization degree: 500) content: 94% by mass, average particle size: 770 μm.

Polyvinyl alcohol particles (D): polyvinyl alcohol (saponification degree: 98 mol %, average polymerization degree: 4200) content: 94% by mass, average particle size: 770 μm.

Polyvinyl alcohol particles (E): polyvinyl alcohol (saponification degree: 98 mol %, average polymerization degree: 1700) content: 94% by mass, average particle size: 130 μm, median size: 1.6 μm.

<Acid Catalyst, Base, Solvent, Carbonyl Compound, Acetalized Carbonyl Compound, and so on>

47 wt % sulfuric acid, 37 wt % hydrochloric acid, sodium hydroxide, potassium hydroxide, acetonitrile, acetone, methanol, dimethylsulfoxide (DMSO), dimethylsulfoxide-d6, deuterated water, sodium deuteroxide, 1-butanal, 1-octanal, 1-nonanal, glyoxylic acid monohydrate, furfural, sodium ortho-benzaldehydesulfonate, aminoacetaldehyde dimethyl acetal, all of which are from Wako Pure Chemical Corporation.

3-methyl-2-butenal (purity: 98%), 7-octenal (purity: 98%), all of which are from Kuraray Co., Ltd.

3-(1,3-dioxalan-2-yl)-2-methyl-1-propene (purity: 98%), which is prepared by a method described in WO 2016/104332.

(Measurement of an Average Particle Size)

An average particle size of polyvinyl alcohol particles (A) to (E) was determined by measuring particle size distribution of a dispersion of polyvinyl alcohol particles (A) to (E) in methanol by laser diffraction using a particle size distribution measuring apparatus (Horiba Ltd., LA-920).

(Determination of an Acetalization Degree)

A modified polyvinyl alcohol resin (0.03 g) obtained in Examples and Comparative Examples described below was dissolved in dimethylsulfoxide-d6 (0.97 g), and was subjected to $^1$H-NMR measurement at 500 MHz. Starting polyvinyl alcohol particles were also subjected to $^1$H-NMR measurement. In Examples 11 to 24 and Comparative Examples 2 to 3 in which glyoxylic acid monohydrate was used as a carbonyl compound, dimethylsulfoxide-d6 was replaced with a 0.1 M solution of sodium deuteroxide in deuterated water. From a $^1$H-NMR spectrum obtained, an acetalization degree was calculated in accordance with the following equation. The results are shown in Tables 1 and 2.

Acetalization degree (mol %)=[(the molar number of hydroxy groups which reacted with a carbonyl compound and/or an acetalized carbonyl compound)/(the total molar number of hydroxy groups and acetyl groups in a starting polyvinyl alcohol)]×100

(Measurement of an Undissolved Residue)

While 90 g of a solvent having the same composition as the solvent used in Examples and Comparative Examples below was stirred at 200 rpm, 10 g of a modified polyvinyl alcohol resin obtained in Examples and Comparative Examples was added, and the mixture was stirred at the same temperature as the reaction temperature in step (A) and 200 rpm for 2 hours. The resulting solution containing undissolved residue was filtrated under reduced pressure at a differential pressure of 0.010±0.002 MPa using a filter paper classified as No. 5A defined in accordance with JIS P3801, and the residual material on the filter paper was dried at 120° C. and a pressure of 0.005 MPa for 6 hours, followed by mass measurement. When each particle or mass of a modified polyvinyl alcohol resin obtained in Examples and Comparative Examples has a diameter at the longest point of more than 3 mm, the resin was pulverized using a pulverizer (Verder Scientific Co., Ltd., ZM-200) such that the diameter became 3 mm or less, followed by the above measurement. The results are shown in Tables 1 and 2.

(Measurement of a Swelling Degree)

Into a 10 mL graduated cylinder was placed 0.5 g of polyvinyl alcohol particles, and a value of the upper end of the polyvinyl alcohol particle aggregate (referred to as "volume A") was read. The polyvinyl alcohol particles were removed, and the 15 g of a solvent having the same composition as that of a solvent used in Examples and Comparative Examples was added, and the mixture was stirred at 60° C. (when a boiling point of the solvent is lower than 60° C., the boiling point) and 200 rpm for 1 hour to swell the particles. After cooling to 25° C., a mixture of the polyvinyl alcohol particles and the solvent was transferred to a graduated cylinder, and a value of the upper end of the polyvinyl alcohol particle aggregate (referred to as "volume B") was read. From volume A and volume B obtained, a swelling degree was calculated in accordance with the following equation. The results are shown in Tables 1 and 2.

Swelling degree (vol %)=[(volume $B$)/(volume $A$)]×100

(Shape of a Modified Polyvinyl Alcohol Resin in a Reaction Liquid at the End of Step (A))

A reaction liquid immediately after reacting polyvinyl alcohol particles with a carbonyl compound and before adding an aqueous solution of sodium hydroxide and cooling the reaction liquid, was visually observed. A shape of the modified polyvinyl alcohol resin was recorded as "particulate" when particles were observed in the reaction liquid, and as "solution" when no solids were observed giving a homogeneous solution. The results are shown in Tables 1 and 2.

Example 1

To a three-necked flask equipped with a reflux condenser and a thermometer were added 20.1 g of acetone and 5.16 g of 1-butanal at room temperature (20° C.), and with stirring by a magnetic stirrer, 9.0 g of polyvinyl alcohol (A) was added over 1 min. A mixed solution of 31.5 g of water and 3.3 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 1:1 (weight ratio) mixed solvent of acetone and water, and then dried at 120° C. and a pressure of 0.005 MPa for 6 hours.

Example 2

To a three-necked flask equipped with a reflux condenser and a thermometer were added 38.6 g of acetonitrile and 0.41 g of i-butanal at room temperature (20° C.), and with stirring by a magnetic stirrer, 5.0 g of polyvinyl alcohol (A) was added over 1 min. A mixed solution of 7.9 g of water and 3.3 g of 47 wt % sulfuric acid was added dropwise via a dropping funnel over 5 min, and the mixture was warmed to 78° C. and allowed to react for 3 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 9:1 (weight ratio) mixed solvent of acetonitrile and water, and then dried at 120° C. and a pressure of 0.005 MPa for 6 hours.

Example 3

To a three-necked flask equipped with a reflux condenser and a thermometer were added 46.5 g of acetonitrile and 1.63 g of 1-butanal at room temperature (20° C.), and with stirring by a magnetic stirrer, 10.0 g of polyvinyl alcohol (E) was added over 1 min. Then, 3.1 g of 37 wt % hydrochloric acid was added dropwise via a dropping funnel over 5 min, and the mixture was warmed to 70° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 9:1 (weight ratio) mixed solvent of acetonitrile and water, and then dried at 120° C. and a pressure of 0.005 MPa for 6 hours.

Example 4

To a three-necked flask equipped with a reflux condenser and a thermometer were added 150 g of acetone, 100 g of water and 20.5 g of 1-butanal at room temperature (20° C.), and with stirring by a magnetic stirrer, 50 g of polyvinyl alcohol (A) was added over 1 min. A mixed solution of 50 g of water and 21.2 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 1:1 (weight ratio) mixed solvent of acetone and water, and then dried at 120° C. and a pressure of 0.005 MPa for 6 hours.

Example 5

To a three-necked flask equipped with a reflux condenser and a thermometer were added 150 g of acetone, 100 g of water and 12.3 g of 1-butanal at room temperature (20° C.), and with stirring by a magnetic stirrer, 50 g of polyvinyl alcohol (A) was added over 1 min. A mixed solution of 50 g of water and 21.2 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 1:1 (weight ratio) mixed solvent of acetone and water, and then dried at 120° C. and a pressure of 0.005 MPa for 6 hours.

Example 6

To a three-necked flask equipped with a reflux condenser and a thermometer were added 150 g of acetone, 100 g of water and 4.1 g of 1-butanal at room temperature (20° C.), and with stirring by a magnetic stirrer, 50 g of polyvinyl alcohol (A) was added over 1 min. A mixed solution of 50 g of water and 21.2 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 1:1 (weight ratio) mixed solvent of acetone and water, and then dried at 120° C. and a pressure of 0.005 MPa for 6 hours.

Example 7

To a three-necked flask equipped with a reflux condenser and a thermometer were added 38.6 g of methanol and 0.82 g of 1-butanal at room temperature (20° C.), and with stirring by a magnetic stirrer, 5.0 g of polyvinyl alcohol (A) was added over 1 min. A mixed solution of 7.9 g of water and 3.3 g of 47 wt % sulfuric acid was added dropwise via a dropping funnel over 5 min, and the mixture was warmed to 65° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 1:1 (weight ratio) mixed solvent of acetone and water, and then dried at 120° C. and a pressure of 0.005 MPa for 6 hours.

Example 8

To a three-necked flask equipped with a reflux condenser and a thermometer were added 3.4 g of acetonitrile, 43.1 g of water and 0.41 g of 1-butanal at room temperature (20° C.), and with stirring by a magnetic stirrer, 5.0 g of polyvinyl alcohol (E) was added over 1 min. Then, 3.3 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 1:1 (weight ratio) mixed solvent of acetone and water, and then dried at 120° C. and a pressure of 0.005 MPa for 6 hours.

Example 9

To a three-necked flask equipped with a reflux condenser and a thermometer were added 150 g of acetone, 100 g of water and 14.5 g of 1-octanal at room temperature (20° C.), and with stirring by a magnetic stirrer, 50 g of polyvinyl alcohol (E) was added over 1 min. Then, a mixed solution of 50 g of water and 21.2 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 1:1 (weight ratio) mixed solvent of acetone and water, and then dried at 120° C. and a pressure of 0.005 MPa for 6 hours.

Example 10

To a three-necked flask equipped with a reflux condenser and a thermometer were added 150 g of acetone, 100 g of water and 16.1 g of 1-nonanal at room temperature (20° C.), and with stirring by a magnetic stirrer, 50 g of polyvinyl alcohol (E) was added over 1 min. Then, a mixed solution of 50 g of water and 21.2 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. A 1 mol/L aqueous solution of sodium hydroxide was added until pH became 8, and then the solid was taken out by filtration. The solid was washed five times with a 1:1 (weight ratio) mixed solvent of acetone and water, and then dried at 120° C. and a pressure of 0.005 MPa for 6 hours.

Example 11

To a three-necked flask equipped with a reflux condenser and a thermometer was added 38.6 g of acetonitrile at room temperature (20° C.), and with stirring by a magnetic stirrer, 3.0 g of polyvinyl alcohol (A) was gradually added. Then, a mixed solution of 0.705 g of glyoxylic acid monohydrate, 5.4 g of water and 3.3 g of 47 wt % sulfuric acid was added dropwise via a dropping funnel over 5 min, and the mixture was warmed to 78° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 12

To a three-necked flask equipped with a reflux condenser and a thermometer was added 38.6 g of acetonitrile at room temperature (20° C.), and with stirring by a magnetic stirrer, 3.0 g of polyvinyl alcohol (A) was gradually added. Then, a mixed solution of 3.53 g of glyoxylic acid monohydrate, 5.4 g of water and 3.3 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 13

To a three-necked flask equipped with a reflux condenser and a thermometer was added 38.6 g of acetonitrile at room temperature (20° C.), and with stirring by a magnetic stirrer, 3.0 g of polyvinyl alcohol (A) was gradually added. Then, a mixed solution of 8.52 g of glyoxylic acid monohydrate, 5.4 g of water and 3.3 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 14

To a three-necked flask equipped with a reflux condenser and a thermometer was added 38.6 g of acetonitrile at room temperature (20° C.), and with stirring by a magnetic stirrer, 10 g of polyvinyl alcohol (A) was gradually added. Then, a mixed solution of 1.05 g of glyoxylic acid monohydrate, 5.4 g of water and 3.3 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 15

To a three-necked flask equipped with a reflux condenser and a thermometer was added 38.6 g of acetonitrile at room temperature (20° C.), and with stirring by a magnetic stirrer, 10 g of polyvinyl alcohol (A) was gradually added. Then, a mixed solution of 1.05 g of glyoxylic acid monohydrate, 5.4 g of water and 3.3 g of 47 wt % sulfuric acid was added dropwise via a dropping funnel over 5 min, and the mixture was warmed to 70° C. and allowed to react for 12 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 16

To a three-necked flask equipped with a reflux condenser and a thermometer was added 38.6 g of acetonitrile at room temperature (20° C.), and with stirring by a magnetic stirrer, 10 g of polyvinyl alcohol (E) was gradually added. Then, a mixed solution of 1.05 g of glyoxylic acid monohydrate, 5.4 g of water and 3.3 g of 47 wt % sulfuric acid was added dropwise via a dropping funnel over 5 min, and the mixture was warmed to 70° C. and allowed to react for 12 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 17

To a three-necked flask equipped with a reflux condenser and a thermometer was added 38.6 g of acetonitrile at room temperature (20° C.), and with stirring by a magnetic stirrer, 10 g of polyvinyl alcohol (B) was gradually added. Then, a mixed solution of 1.05 g of glyoxylic acid monohydrate, 5.4 g of water and 3.3 g of 47 wt % sulfuric acid was added dropwise via a dropping funnel over 5 min, and the mixture was warmed to 70° C. and allowed to react for 12 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 18

To a three-necked flask equipped with a reflux condenser and a thermometer was added 38.6 g of acetonitrile at room temperature (20° C.), and with stirring by a magnetic stirrer, 30 g of polyvinyl alcohol (A) was gradually added. Then, a mixed solution of 3.15 g of glyoxylic acid monohydrate, 5.4 g of water and 3.3 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 19

To a three-necked flask equipped with a reflux condenser and a thermometer was added 77.2 g of acetonitrile at room temperature (20° C.), and with stirring by a magnetic stirrer, 20 g of polyvinyl alcohol (A) was gradually added. Then, a mixed solution of 4.2 g of glyoxylic acid monohydrate, 10.8 g of water and 6.6 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 20

To a three-necked flask equipped with a reflux condenser and a thermometer was added 77.2 g of acetone at room temperature (20° C.), and with stirring by a magnetic stirrer, 20 g of polyvinyl alcohol (A) was gradually added. Then, a mixed solution of 4.2 g of glyoxylic acid monohydrate, 10.8 g of water and 6.6 g of 47 wt % sulfuric acid was added dropwise via a dropping funnel over 5 min, and the mixture was warmed to 56° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 21

To a three-necked flask equipped with a reflux condenser and a thermometer was added 46.5 g of acetone at room temperature (20° C.), and with stirring by a magnetic stirrer, 10 g of polyvinyl alcohol (E) was gradually added. Then, a mixed solution of 1.05 g of glyoxylic acid monohydrate and 3.3 g of 47 wt % sulfuric acid was added dropwise via a dropping funnel over 5 min, and the mixture was warmed to 56° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 22

To a three-necked flask equipped with a reflux condenser and a thermometer were added 38.6 g of acetonitrile and 5.4 g of dimethylsulfoxide at room temperature (20° C.), and with stirring by a magnetic stirrer, 10 g of polyvinyl alcohol (E) was gradually added. Then, a mixture of 1.05 g of glyoxylic acid monohydrate and 3.3 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 23

To a three-necked flask equipped with a reflux condenser and a thermometer was added 38.6 g of acetonitrile at room temperature (20° C.), and with stirring by a magnetic stirrer, 10 g of polyvinyl alcohol (C) was gradually added. Then, a mixed solution of 1.05 g of glyoxylic acid monohydrate, 5.4 g of water and 3.3 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 24

To a three-necked flask equipped with a reflux condenser and a thermometer was added 38.6 g of acetonitrile at room temperature (20° C.), and with stirring by a magnetic stirrer, 10 g of polyvinyl alcohol (D) was gradually added. Then, a mixed solution of 1.05 g of glyoxylic acid monohydrate, 5.4 g of water and 3.3 g of 47 wt % sulfuric acid was added dropwise via a dropping funnel over 5 min, and the mixture was warmed to 70° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 25

To a three-necked flask equipped with a reflux condenser and a thermometer were added 38.6 g of acetonitrile and 3.31 g of furfural at room temperature (20° C.), and with stirring by a magnetic stirrer, 3.0 g of polyvinyl alcohol (A) was gradually added. Then, a mixed solution of 7.9 g of water and 0.66 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 26

To a three-necked flask equipped with a reflux condenser and a thermometer were added 193 g of acetonitrile and 1.82 g of 3-(1,3-dioxalan-2-yl)-2-methyl-1-propene at room temperature (20° C.), and with stirring by a magnetic stirrer, 50 g of polyvinyl alcohol (A) was gradually added. Then, a mixed solution of 39.5 g of water and 16.5 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 27

To a three-necked flask equipped with a reflux condenser and a thermometer were added 193 g of acetonitrile and 1.82 g of 3-(1,3-dioxalan-2-yl)-2-methyl-1-propene at room temperature (20° C.), and with stirring by a magnetic stirrer, 50 g of polyvinyl alcohol (E) was gradually added. Then, a mixed solution of 39.5 g of water and 16.5 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 28

To a three-necked flask equipped with a reflux condenser and a thermometer were added 193 g of acetonitrile and 0.74 g of 3-(1,3-dioxalan-2-yl)-2-methyl-1-propene at room temperature (20° C.), and with stirring by a magnetic stirrer, 50 g of polyvinyl alcohol (E) was gradually added. Then, a mixed solution of 39.5 g of water and 16.5 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 29

To a three-necked flask equipped with a reflux condenser and a thermometer were added 38.6 g of acetonitrile and 4.4 g of 3-(1,3-dioxalan-2-yl)-2-methyl-1-propene at room temperature (20° C.), and with stirring by a magnetic stirrer, 3.0 g of polyvinyl alcohol (A) was gradually added. Then, a mixed solution of 7.9 g of water and 3.3 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 1:1 (weight ratio) mixed solvent of acetonitrile and water, and then dried at 120° C. and a pressure of 0.005 MPa for 6 hours.

Example 30

To a three-necked flask equipped with a reflux condenser and a thermometer were added 38.6 g of acetonitrile, 7.9 g of water and 0.373 g of sodium ortho-benzaldehydesulfonate at room temperature (20° C.), and with stirring by a magnetic stirrer, 3 g of polyvinyl alcohol (A) was gradually added. Then, 3.3 g of 47 wt % sulfuric acid was added dropwise via a dropping funnel over 5 min, and the mixture was warmed to 78° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 31

To a three-necked flask equipped with a reflux condenser and a thermometer were added 38.6 g of acetonitrile and 0.183 g of aminoacetaldehyde dimethylacetal at room temperature (20° C.), and with stirring by a magnetic stirrer, 3 g of polyvinyl alcohol (A) was gradually added. Then, a mixed solution of 7.9 g of water and 3.3 g of 47 wt % sulfuric acid was added dropwise via a dropping funnel over 5 min, and the mixture was warmed to 78° C. and allowed to react for 5 hours. Immediately after warming, swelling of the polyvinyl alcohol particles was confirmed by visual observation. After the reaction, the solid was taken out by filtration, washed five times with a 9:1 (weight ratio) mixed solvent of acetonitrile and water, and then dried at 120° C. and a pressure of 0.005 MPa for 6 hours.

Example 32

To a three-necked flask equipped with a reflux condenser and a thermometer were added 38.6 g of acetonitrile and 0.366 g of aminoacetaldehyde dimethylacetal at room temperature (20° C.), and with stirring by a magnetic stirrer, 3 g of polyvinyl alcohol (A) was gradually added. Then, a mixed solution of 7.9 g of water and 3.3 g of 47 wt % sulfuric acid was added dropwise via a dropping funnel over 5 min, and the mixture was warmed to 78° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 33

To a three-necked flask equipped with a reflux condenser and a thermometer were added 38.6 g of acetonitrile and 2.89 g of 3-methyl-2-butenal at room temperature (20° C.), and with stirring by a magnetic stirrer, 3 g of polyvinyl alcohol (A) was gradually added. Then, a mixed solution of 7.9 g of water and 3.3 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 34

To a three-necked flask equipped with a reflux condenser and a thermometer were added 38.6 g of acetone and 2.89 g of 3-methyl-2-butenal at room temperature (20° C.), and with stirring by a magnetic stirrer, 3 g of polyvinyl alcohol (A) was gradually added. Then, a mixed solution of 7.9 g of water and 3.3 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 35

To a three-necked flask equipped with a reflux condenser and a thermometer were added 193 g of acetonitrile and 1.79 g of 7-octenal at room temperature (20° C.), and with stirring by a magnetic stirrer, 50 g of polyvinyl alcohol (E) was gradually added. Then, a mixed solution of 39.5 g of water and 16.5 g of 47 wt % sulfuric acid was added dropwise via a dropping funnel over 5 min, and the mixture was warmed to 30° C. and allowed to react for 5 hours. Immediately after warming, swelling of the polyvinyl alcohol particles was confirmed by visual observation. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Example 36

To a three-necked flask equipped with a reflux condenser and a thermometer were added 193 g of acetonitrile and 1.79 g of 7-octenal at room temperature (20° C.), and with stirring by a magnetic stirrer, 50 g of polyvinyl alcohol (A) was gradually added. Then, a mixed solution of 39.5 g of water and 16.5 g of 47 wt % sulfuric acid was added dropwise via a dropping funnel over 5 min, and the mixture was warmed to 30° C. and allowed to react for 5 hours. After a 1 mol/L aqueous solution of sodium hydroxide was added until pH became 8, the solid was taken out by filtration, washed five times with a 9:1 (weight ratio) mixed solvent of acetonitrile and water, and then dried at 120° C. and a pressure of 0.005 MPa for 6 hours.

Comparative Example 1

To a three-necked flask equipped with a reflux condenser and a thermometer were added 46.5 g of water and 0.41 g of 1-butanal at room temperature (20° C.), and with stirring by a magnetic stirrer, 10 g of polyvinyl alcohol (A) was gradually added. Then, 3.3 g of 47 wt % sulfuric acid was added dropwise via a dropping funnel over 5 min, and the mixture was warmed to 90° C. and allowed to react for 5 hours. After a 1 mol/L aqueous solution of sodium hydroxide was added until pH became 8, the mixture was dried at 30° C. and a pressure of 0.005 MPa for 48 hours.

Comparative Example 2

To a three-necked flask equipped with a reflux condenser and a thermometer was added 44.0 g of water at room temperature (20° C.), and with stirring by a magnetic stirrer, 10 g of polyvinyl alcohol (A) was gradually added. Then, a mixture of 1.05 g of glyoxylic acid monohydrate and 3.3 g of 47 wt % sulfuric acid was added dropwise via a dropping funnel over 5 min, and the mixture was warmed to 90° C. and allowed to react for 5 hours. After a 1 mol/L aqueous solution of sodium hydroxide was added until pH became 8, the mixture was dried at 30° C. and a pressure of 0.005 MPa for 48 hours.

Comparative Example 3

To a three-necked flask equipped with a reflux condenser and a thermometer were added 46.5 g of hexane and 1.05 g of glyoxylic acid monohydrate at room temperature (20° C.), and with stirring by a magnetic stirrer, 10 g of polyvinyl alcohol (A) was gradually added. Then, 3.3 g of trifluoroacetic acid was added dropwise via a dropping funnel over 5 min, and the mixture was warmed to 30° C. and allowed to react for 5 hours. It was confirmed by visual observation that even after warming, the polyvinyl alcohol particles were not swollen. After the reaction, the solid was taken out by filtration, washed five times with a 9:1 (weight ratio) mixed solvent of acetonitrile and water, and then dried at 120° C. and a pressure of 0.005 MPa for 6 hours.

TABLE 1

| | | Polyvinyl alchohol particles (g) | Carbonyl compound/ Acetalized carbonyl compound (g) | Solvent | | Hansen solubility parameters | | | Acid catalyst (g) |
|---|---|---|---|---|---|---|---|---|---|
| | | | | | (g) | δD | δP | δH | |
| Example | 1 | (A) 9 | 1-Butanal 5.16 | Water 31.5 | Acetone 20.1 | 15.5 | 13.5 | 26.5 | Sulfuric acid[a] 3.3 |
| | 2 | (A) 5 | 1-Butanal 0.41 | Water 7.9 | Acetonitrile 38.6 | 15.3 | 17.7 | 11.1 | Sulfuric acid[a] 3.3 |
| | 3 | (E) 10 | 1-Butanal 1.63 | Acetonitrile 46.5 | | 15.3 | 18.0 | 6.1 | Hydrochloric acid[b] 3.1 |
| | 4 | (A) 50 | 1-Butanal 20.5 | Water 150 | Acetone 150 | 15.5 | 12.9 | 22.5 | Sulfuric acid[a] 21.2 |
| | 5 | (A) 50 | 1-Butanal 12.3 | Water 150 | Acetone 150 | 15.5 | 12.9 | 22.5 | Sulfuric acid[a] 21.2 |

TABLE 1-continued

| | | | | | | | | |
|---|---|---|---|---|---|---|---|---|
| 6 | (A) 50 | 1-Butanal 4.1 | Water 150 | Acetone 150 | 15.5 | 12.9 | 22.5 | Sulfuric acid[a] 21.2 |
| 7 | (A) 5 | 1-Butanal 0.82 | Water 7.9 | Methanol 38.6 | 15.2 | 12.8 | 25.1 | Sulfuric acid[a] 3.3 |
| 8 | (E) 5 | 1-Butanal 0.41 | Water 43.1 | Acetonitrile 3.4 | 15.5 | 16.2 | 39.0 | Sulfuric acid[a] 3.3 |
| 9 | (E) 50 | 1-Octanal 14.5 | Water 150 | Acetone 150 | 15.5 | 12.9 | 22.5 | Sulfuric acid[a] 21.2 |
| 10 | (E) 50 | 1-Nonanal 16.1 | Water 150 | Acetone 150 | 15.5 | 12.9 | 22.5 | Sulfuric acid[a] 21.2 |
| 11 | (A) 3 | Glyoxylic acid monohydrate 0.705 | Water 5.4 | Acetonitrile 38.6 | 15.3 | 17.8 | 9.7 | Sulfuric acid[a] 3.3 |
| 12 | (A) 3 | Glyoxylic acid monohydrate 3.53 | Water 5.4 | Acetonitrile 38.6 | 15.3 | 17.8 | 9.7 | Sulfuric acid[a] 3.3 |
| 13 | (A) 3 | Glyoxylic acid monohydrate 8.52 | Water 5.4 | Acetonitrile 38.6 | 15.3 | 17.8 | 9.7 | Sulfuric acid[a] 3.3 |
| 14 | (A) 10 | Glyoxylic acid monohydrate 1.05 | Water 5.4 | Acetonitrile 38.6 | 15.3 | 17.8 | 9.7 | Sulfuric acid[a] 3.3 |
| 15 | (A) 10 | Glyoxylic acid monohydrate 1.05 | Water 5.4 | Acetonitrile 38.6 | 15.3 | 17.8 | 9.7 | Sulfuric acid[a] 3.3 |
| 16 | (E) 10 | Glyoxylic acid monohydrate 1.05 | Water 5.4 | Acetonitrile 38.6 | 15.3 | 17.8 | 9.7 | Sulfuric acid[a] 3.3 |
| 17 | (B) 10 | Glyoxylic acid monohydrate 1.05 | Water 5.4 | Acetonitrile 38.6 | 15.3 | 17.8 | 9.7 | Sulfuric acid[a] 3.3 |
| 18 | (A) 30 | Glyoxylic acid monohydrate 3.15 | Water 5.4 | Acetonitrile 38.6 | 15.3 | 17.8 | 9.7 | Sulfuric acid[a] 3.3 |
| 19 | (A) 20 | Glyoxylic acid monohydrate 4.2 | Water 10.8 | Acetonitrile 77.2 | 15.3 | 17.8 | 9.7 | Sulfuric acid[a] 6.6 |
| 20 | (A) 20 | Glyoxylic acid monohydrate 4.2 | Water 10.8 | Acetonitrile 77.2 | 15.5 | 11.0 | 10.5 | Sulfuric acid[a] 6.6 |
| 21 | (E) 10 | Glyoxylic acid monohydrate 1.05 | | Acetone 46.5 | 15.5 | 10.4 | 7.0 | Sulfuric acid[a] 3.3 |
| 22 | (E) 10 | Glyoxylic acid monohydrate 1.05 | DMSO 5.4 | Acentonitrile 38.6 | 15.6 | 17.9 | 6.5 | Sulfuric acid[a] 3.3 |
| 23 | (C) 10 | Glyoxylic acid monohydrate 1.05 | Water 5.4 | Acetonitrile 38.6 | 15.3 | 17.8 | 9.7 | Sulfuric acid[a] 3.3 |
| 24 | (D) 10 | Glyoxylic acid monohydrate 1.05 | Water 5.4 | Acetonitrile 38.6 | 15.3 | 17.8 | 9.7 | Sulfuric acid[a] 3.3 |

| | | Content of an organic solvent in a solvent (mass %) | Reaction temperature (° C.) | Reaction time (hr) | Acetalization degree (mol %) | Undissolved residue[c] (g) | Swelling degree (vol %) | Shape[d] |
|---|---|---|---|---|---|---|---|---|
| Example | 1 | 36.6 | 30 | 5 | 46.8 | 9 | 182 | Particulate |
| | 2 | 77.5 | 78 | 3 | 9.4 | 10 | 119 | Particulate |
| | 3 | 93.8 | 70 | 5 | 15.8 | 10 | 107 | Particulate |
| | 4 | 46.7 | 30 | 5 | 31.9 | 9 | 149 | Particulate |
| | 5 | 46.7 | 30 | 5 | 25.8 | 9 | 149 | Particulate |
| | 6 | 46.7 | 30 | 5 | 9.6 | 9 | 149 | Particulate |
| | 7 | 77.5 | 65 | 5 | 19 | 8 | 132 | Particulate |
| | 8 | 6.8 | 70 | 5 | 7.7 | 8 | 362 | Particulate |
| | 9 | 46.7 | 30 | 5 | 19 | 9 | 152 | Particulate |
| | 10 | 46.7 | 30 | 5 | 21 | 9 | 152 | Particulate |
| | 11 | 81.6 | 78 | 5 | 14.9 | 9 | 114 | Particulate |
| | 12 | 81.6 | 70 | 5 | 38.8 | 10 | 114 | Particulate |
| | 13 | 81.6 | 70 | 5 | 45 | 9 | 114 | Particulate |
| | 14 | 81.6 | 70 | 5 | 7.5 | 8 | 114 | Particulate |
| | 15 | 81.6 | 70 | 12 | 70 | 8 | 114 | Particulate |
| | 16 | 81.6 | 70 | 12 | 9.5 | 8 | 116 | Particulate |
| | 17 | 81.6 | 70 | 12 | 8.9 | 9 | 113 | Particulate |
| | 18 | 81.6 | 70 | 5 | 5.8 | 8 | 114 | Particulate |
| | 19 | 81.6 | 70 | 5 | 12.5 | 9 | 114 | Particulate |
| | 20 | 81.6 | 56 | 5 | 3.6 | 10 | 114 | Particulate |
| | 21 | 93.4 | 56 | 5 | 6.6 | 9 | 108 | Particulate |

TABLE 1-continued

| | | | | | | | |
|---|---|---|---|---|---|---|---|
| 22 | 93.0 | 70 | 5 | 7.2 | 9 | 125 | Particulate |
| 23 | 81.6 | 70 | 5 | 9.1 | 10 | 115 | Particulate |
| 24 | 81.6 | 70 | 5 | 8.4 | 10 | 112 | Particulate |

[a] In all cases, sulfuric acid used as an acid catalyst has a concentration of 47 wt %.

[b] Hydrochloric acid used as an acid catayst (Example 3) has a concentration of 37 wt %.

[c] "Undissolved residue" means an undissolved residue when 10 g of a modified polyvinyl alcohol resin is added to 90 g of the solvent, followed by stirring at 200 rpm and the same temperature as the reaction temperature of step (A) for 2 hours.

[d] "Shape" means a shape of a modified polyvinyl alcohol resin in a reaction liquid at the end of step (A).

TABLE 2

| | | Polyvinyl alchohol particles (g) | Carbonyl compound/ Acetalized carbonyl compound (g) | Solvent (g) | | Hansen solubility parameters | | | Acid catalyst (g) |
|---|---|---|---|---|---|---|---|---|---|
| | | | | | | δD | δP | δH | |
| Example | 25 | (A) 3 | Furfural 3.31 | Water 7.9 | Acetonitrile 38.6 | 15.3 | 17.7 | 11.1 | Sulfuric acid[a] 0.66 |
| | 26 | (A) 50 | 3-(1,3-Dioxalan-2-yl)- 2-methyl-1-propene 1.82 | Water 39.5 | Acetonitrile 193 | 15.3 | 17.7 | 11.1 | Sulfuric acid[a] 16.5 |
| | 27 | (E) 50 | 3-(1,3-Dioxalan-2-yl)- 2-methyl-1-propene 1.82 | Water 39.5 | Acetonitrile 193 | 15.3 | 17.7 | 11.1 | Sulfuric acid[a] 16.5 |
| | 28 | (E) 50 | 3-(1,3-Dioxalan-2-yl)- 2-methyl-1-propene 0.74 | Water 39.5 | Acetonitrile 193 | 15.3 | 17.7 | 11.1 | Sulfuric acid[a] 16.5 |
| | 29 | (A) 3 | 3-(1,3-Dioxalan-2-yl)- 2-methyl-1-propene 4.4 | Water 7.9 | Acetonitrile 38.6 | 15.3 | 17.7 | 11.1 | Sulfuric acid[a] 3.3 |
| | 30 | (A) 3 | Sodium ortho- benzaldehye-sulfonate 0.373 | Water 7.9 | Acetonitrile 38.6 | 15.3 | 17.7 | 11.1 | Sulfuric acid[a] 3.3 |
| | 31 | (A) 3 | Aminoacetaldehyde dimethylacetal 0.183 | Water 7.9 | Acetonitrile 38.6 | 15.3 | 17.7 | 11.1 | Sulfuric acid[a] 3.3 |
| | 32 | (A) 3 | Aminoacetaldehyde dimethylacetal 0.366 | Water 7.9 | Acetonitrile 38.6 | 15.3 | 17.7 | 11.1 | Sulfuric acid[a] 3.3 |
| | 33 | (A) 3 | 3-Methyl-2-butenal 2.89 | Water 7.9 | Acetonitrile 38.6 | 15.3 | 17.7 | 11.1 | Sulfuric acid[a] 3.3 |
| | 34 | (A) 3 | 3-Methyl-2-butenal 2.89 | Water 7.9 | Acetonitrile 38.6 | 15.5 | 11.2 | 11.9 | Sulfuric acid[a] 3.3 |
| | 35 | (E) 50 | 7-Octenal 1.79 | Water 39.5 | Acetonitrile 193 | 15.3 | 17.7 | 11.1 | Sulfuric acid[a] 16.5 |
| | 36 | (A) 50 | 7-Octenal 1.79 | Water 39.5 | Acetonitrile 193 | 15.3 | 17.7 | 11.1 | Sulfuric acid[a] 16.5 |
| Comparative Example | 1 | (A) 10 | 1-Butanal 0.41 | Water 46.5 | | 15.5 | 16.0 | 42.3 | Sulfuric acid[a] 3.3 |
| | 2 | (A) 10 | Glyoxylic acid monohydrate 1.05 | Water 44 | | 15.5 | 16.0 | 42.3 | Sulfuric acid[a] 3.3 |
| | 3 | (A) 10 | Glyoxylic acid monohydrate 1.05 | Hexane 46.5 | | 14.9 | 0.0 | 0.0 | Trifluoro- acetic acid 3.3 |

| | | Content of an organic solvent in a solvent (mass %) | Reaction temperature (° C.) | Reaction time (hr) | Acetali- zation degree (mol %) | Un- dissolved residue[c] (g) | Swelling degree (vol %) | Shape[d] |
|---|---|---|---|---|---|---|---|---|
| Example | 25 | 81.8 | 30 | 5 | 41.1 | 10 | 119 | Particulate |
| | 26 | 77.5 | 30 | 5 | 2.3 | 10 | 119 | Particulate |
| | 27 | 77.5 | 30 | 5 | 2.2 | 10 | 120 | Particulate |
| | 28 | 77.5 | 30 | 5 | 1.2 | 10 | 120 | Particulate |
| | 29 | 77.5 | 30 | 5 | 50.7 | 10 | 119 | Particulate |
| | 30 | 77.5 | 78 | 5 | 5.8 | 10 | 119 | Particulate |
| | 31 | 77.5 | 78 | 5 | 2.3 | 10 | 119 | Particulate |
| | 32 | 77.5 | 78 | 5 | 6.3 | 10 | 119 | Particulate |
| | 33 | 77.5 | 30 | 5 | 2 | 10 | 119 | Particulate |
| | 34 | 77.5 | 30 | 5 | 6 | 10 | 119 | Particulate |
| | 35 | 77.5 | 30 | 5 | 1.9 | 10 | 120 | Particulate |
| | 36 | 77.5 | 30 | 5 | 2.4 | 10 | 119 | Particulate |

TABLE 2-continued

| | | | | | | | | |
|---|---|---|---|---|---|---|---|---|
| Comparative Example | 1 | 0.0 | 90 | 5 | 8.2 | 0 | 387 | Solution |
| | 2 | 0.0 | 90 | 5 | 2.1 | 3 | 387 | Solution |
| | 3 | 93.4 | 30 | 5 | 0 | 10 | 100 | Particulate |

[a]In all cases, sulfuric acid used as an acid catalyst has a concentration of 47 wt %.
[c]"Undissolved residue" means an undissolved residue when 10 g of a modified polyvinyl alcohol resin is added to 90 g of the solvent, followed by stirring at 200 rpm and the same temperature as the reaction temperature of step (A) for 2 hours.
[d]"Shape" means a shape of a modified polyvinyl alcohol resin in a reaction liquid at the end of step (A).

As seen from Examples 1 to 36, a production method comprising step (A) of acetalizing polyvinyl alcohol particles swollen with a solvent capable of swelling the polyvinyl alcohol particles by reacting them with a carbonyl compound and/or an acetalized carbonyl compound in the presence of the solvent, wherein a content of an organic solvent in the solvent is 5% by mass or more, can be applicable to a wide variety of carbonyl compounds, and after step (A), a modified polyvinyl alcohol resin can be conveniently taken out from a reaction liquid by filtration, so that productivity is improved.

In contrast, when a content of an organic solvent in a solvent is 5% by mass or less as in Comparative Examples 1 and 2, a modified polyvinyl alcohol resin produced is dissolved in a reaction liquid. Therefore, a process of taking out a modified polyvinyl alcohol resin from a reaction liquid by, for example, completely evaporating the solvent contained in the reaction liquid is required, leading to a complex production process. Furthermore, since filtration or washing with a solvent is not performed in Comparative Examples 1 and 2, a product contains impurities represented by a neutralized salt. For increasing purity by removing impurities in Comparative Examples 1 and 2, it is necessary that for example, the resin is pulverized, and then the solid is washed five times with a 1:1 (weight ratio) mixed solvent of acetone and water and dried at 120° C. and a pressure of 0.005 MPa for 6 hours.

When a solvent capable of swelling polyvinyl alcohol particles is not used as in Comparative Example 3, an acetalization reaction does not proceed.

The invention claimed is:

1. A method for producing a modified polyvinyl alcohol resin, the method comprising:
    acetalizing polyvinyl alcohol particles swollen with a solvent capable of swelling the polyvinyl alcohol particles by reacting the polyvinyl alcohol particles with a carbonyl compound and/or an acetalized carbonyl compound in the presence of the solvent, wherein a content of an organic solvent in the solvent is 5% by mass or more, the modified polyvinyl alcohol resin as a product in a reaction liquid at the end of the acetalizing and just before quenching the acetalization reaction is particulate, the solvent has Hansen solubility parameters, δD: 15.0 or more and 20.0 or less, δP: 1.0 or more and 20.0 or less, and δH: 3.0 or more and 41.0 or less, the organic solvent is at least one selected from the group consisting of a dialkyl ketone, a nitrile, an alcohol and an ether, and the carbonyl compound is an aldehyde.

2. The method according to claim 1, wherein the solvent contains 5 to 95% by mass of water.

3. The method according to claim 1, wherein the organic solvent is at least one selected from the group consisting of acetone, 2-butanone, acetonitrile, methanol, ethanol, 1-propanol, 2-propanol, tert-butanol, 1,4-dioxane and tetrahydrofuran.

4. The method according to claim 1, wherein a content of an alkyl acetate in the solvent is 90 mol % or less based on the number of structural units constituting the polyvinyl alcohol contained in the polyvinyl alcohol particles.

5. The method according to claim 1, wherein a swelling degree, which is defined as a volume increasing rate when 15 g of the solvent is added to 0.5 g of the polyvinyl alcohol particles followed by stirring at 60° C. and 200 rpm for one hour, is 105 to 1000 vol %.

6. The method according to claim 1, wherein the amount of the polyvinyl alcohol particles is 1% by mass or more and 95% by mass or less based on the total mass of a reaction liquid after adding the polyvinyl alcohol particles.

7. The method according to claim 1, wherein the acetalizing is conducted in the presence of an acid catalyst.

8. The method according to claim 1, wherein a modified polyvinyl alcohol resin with an acetalization degree of 1 mol % or more and 90 mol % or less is produced.

9. The method according to claim 1, wherein a saponification degree of the polyvinyl alcohol resin contained in the polyvinyl alcohol particles is 30 mol % or more.

10. The method according to claim 1, wherein an average polymerization degree of the polyvinyl alcohol resin contained in the polyvinyl alcohol particles is 500 or more and 4500 or less.

11. The method according to claim 1, wherein the polyvinyl alcohol particles have an average particle size of 1000 μm or less.

12. The method according to claim 1, wherein when 10 g of the modified polyvinyl alcohol resin obtained is added to 90 g of the solvent followed by stirring at 200 rpm and the same temperature as a reaction temperature of the acetalizing for 2 hours, an amount of an undissolved residue is 8 g or more.

* * * * *